(12) United States Patent
Brzoskowski et al.

(10) Patent No.: US 6,300,418 B1
(45) Date of Patent: Oct. 9, 2001

(54) THERMOPLASTIC ELASTOMER COMPOSITION ADAPTED FOR ADHESION TO POLAR MATERIALS

(75) Inventors: Ryszard Brzoskowski, Acton; Mohammed R Sadeghi, Leominster, both of MA (US)

(73) Assignee: DSM N.V., Heerlen (NL)

( * ) Notice: Subject to any disclaimer, the term of this patent is extended or adjusted under 35 U.S.C. 154(b) by 0 days.

(21) Appl. No.: 09/432,068

(22) Filed: Nov. 2, 1999

Related U.S. Application Data

(60) Provisional application No. 60/045,504, filed on May 2, 1997.

(30) Foreign Application Priority Data

May 2, 1997 (WO) ................................. PCT/NL98/00232
May 22, 1997 (EP) ................................................ 97201432

(51) Int. Cl.[7] ............................ C08L 33/00; C08L 35/00; C08L 39/00
(52) U.S. Cl. ........................ 525/191; 525/217; 525/218; 525/232; 525/240; 525/241
(58) Field of Search .................................... 525/191, 217, 525/218, 232, 240, 241

(56) References Cited

U.S. PATENT DOCUMENTS

| | | |
|---|---|---|
| 3,806,558 | 4/1974 | Fischer . |
| 3,835,201 | 9/1974 | Fischer . |
| 3,957,919 | 5/1976 | Von Bodungen et al. . |
| 4,067,068 | 1/1978 | Bregstein et al. . |
| 4,130,535 | 12/1978 | Coran et al. . |
| 4,311,628 | 1/1982 | Abdou-Sabet et al. . |
| 4,957,968 | 9/1990 | Adur et al. . |
| 5,420,198 | 5/1995 | Papazoglou et al. . |
| 5,506,310 | 4/1996 | Vasselin et al. . |

FOREIGN PATENT DOCUMENTS

| | | |
|---|---|---|
| 90/03418 | 4/1990 | (WO) . |
| 95/26380 | 10/1995 | (WO) . |

*Primary Examiner*—Nathan M. Nutter
(74) *Attorney, Agent, or Firm*—Pillsbury Winthrop LLP

(57) ABSTRACT

The invention relates to an adhesive thermoplastic elastomer composition comprising either a blend of a thermoplastic resin and a rubber, or a thermoplastic elastomeric styrene based blockcopolymer.

Figure 3:
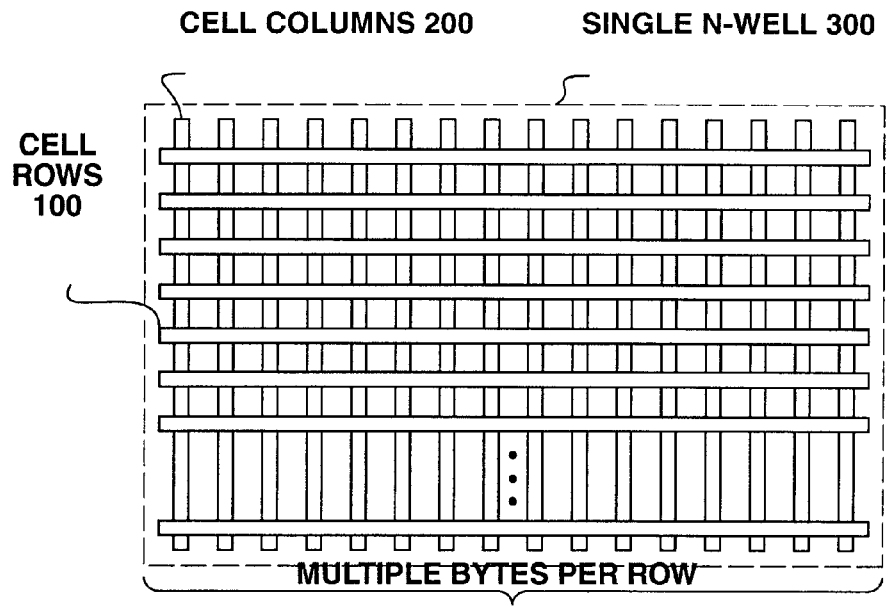

The invention resides in that the composition also comprises an adhesion promotor in the form of a reaction product of a functionalized rubber and a polyamide.

The invention also relates to articles comprising a combination of a substrate and such a composition.

22 Claims, No Drawings

THERMOPLASTIC ELASTOMER COMPOSITION ADAPTED FOR ADHESION TO POLAR MATERIALS

This application claims the benefit of U.S. Provisional Application No. 60/045,504, filed May 2, 1997.

RELATED APPLICATIONS

This is a continuation of International Application No. PCT/NL98/00232 filed Apr. 27,1998.

BACKGROUND OF THE INVENTION

1. Field of the Invention

This invention deals with a thermoplastic elastomer composition having improved adhesion to polar materials, e.g. polar substrates, without requiring pre-treatment of such polar materials or the use of additional adhesives.

2. Description of Related Art

Thermoplastic elastomers are typically materials which exhibit properties between those of crystalline or glassy plastics and soft elastomers. To be considered thermoplastic they must soften upon heating, such that in the molten state they are capable of being shaped by plastic processing techniques, such as injection molding or extrusion.

Blends or alloys of plastic and rubber have become increasingly important in the production of high performance thermoplastic elastomers, particularly for the replacement of thermoset rubber in various applications. Among the more commercially relevant thermoplastic elastomers are those based on physical blends of polyolefins and rubbers.

Various blended products are described in U.S. Pat. Nos. 3,806,558, 3,835,201, 3,957,919, 4,130,535 and 4,311,628. These patent documents generally concern compositions which are comprised of polyolefin resins containing either uncured, partially cured, or fully cured polyolefin rubbers. According to these patent documents further improvements in physical properties such as tensile strength, elongation, and compression set are achieved when the rubber phase is well dispersed into small particles of fixed size. This occurs by curing the rubber in its dispersed state without curing the plastic phase so as to maintain its thermoplasticity.

Another type of thermoplastic elastomer which is frequently used is a thermo-elastomeric styrene based blockcopolymer, or its blend with a polyolefin.

These thermoplastic elastomer compositions are non-polar in nature. Consequently, ensuring that such materials adhere to a polar material presents a considerable challenge. The most common efforts focus on using substrate pre-treatments to improve adhesion or bonding. Industrially practiced pretreatment methods depend on the substrate and include solvent etching, sulfuric acid or chromic acid etching, sodium treatment, ozone treatment, flame treatment, UV irradiation, and plasma treatment. These procedures are costly, use hazardous materials, result in product degradation, and create environmental hazards.

Still other efforts include those described in U.S. Pat. No. 4,957,968, the complete disclosure of which is incorporated herein by reference, in which adhesive thermoplastic elastomer compositions comprised of blends of thermoplastic elastomer (TPE) containing about 15 to 40 wt. % of grafted maleic anhydride polypropylene are applied to substrates. The maleic anhydride (MAR) apparently functions as a means for introducing polarity into the formulation and to react with other reactable functional groups. In the case of bonding to a polyamide-based substrate, both such substrate and the TPE must be in the molten state to initiate the covalent bonds necessary for the adhesion. Adhering to a cold substrate using this so-called adhesive thermoplastic elastomer is generally unsuccessful. Little or no covalent bonds will form at the interface and the adhesion is therefore inadequate.

Another effort is detailed in the PCT International Patent publication WO 95/26380. According to this patent publication, adhesive thermoplastic elastomer compositions can be comprised of blends of thermoplastic elastomers with a reaction product of a functionalized polyolefin and a polyamide. These adhesive thermoplastic elastomers are said to provide improved surface properties and to adhere to engineering resins such as nylon (or polyamide). The improvement asserted over the U.S. Pat. No. 4,067,068 is that maleated polypropylene (PP) is grafted with low molecular weight polyamide to form an adhesion promoter (grafted nylon-MAH-PP). This grafted nylon-MAR-PP then is blended with the selected thermoplastic elastomer to yield the so-called adhesive product. In this case, the need for temperature-dependent covalent bonding across the interface between the composition and a polar material (engineering resin etc.) is eliminated and the polar segment of the dispersed adhesion promoter provides adhesion. Based on the Examples, the disclosed adhesive thermoplastic elastomer compositions would appear to be capable of bonding to Nylon 6.

However, the above-mentioned efforts suffer from some serious drawbacks. One deficiency is that blending the grafted nylon-MAH-PP with the selected thermoplastic elastomer results in a substantial increase in the overall hardness of the resulting thermoplastic elastomers which is, as can also be learned from the examples of the PCT-application, on the order of about 15 points (Shore A hardness). To maintain the starting hardness of the thermoplastic elastomer, common additives such as a block copolymer of styrene/conjugated diene/styrene are used. Compensating for the increase in hardness by starting from or adding amounts of a lower hardness thermoplastic elastomer results in a product exhibiting an inferior combination of physical properties.

Therefore a need remains for a composition which is capable of being adherent to a substrate, such as a polar substrate, without requiring pre-treatments while avoiding the disadvantages associated with the alternatives noted hereinabove.

SUMMARY OF THE INVENTION

An object of the present invention is to provide a thermoplastic elastomer composition having improved adhesion to polar materials, e.g. polar substrates.

Another object of the present invention is provide a thermoplastic elastomer composition adapted for adhering to a polar substrate in which the addition of a adhesion promoter does not substantially increase the hardness of the thermoplastic elastomer composition.

An additional object of the present invention is to provide a thermoplastic elastomer composition in which the adhesion promoter has a lower hardness than the known adhesion promoters for use in thermoplastic elastomer applications.

A further object of the present invention is to provide a thermoplastic elastomer composition in which a higher hardness thermoplastic elastomer starting material can be used without unacceptably degrading the properties of the final adhesive composition.

Yet another object of the present invention is to provide a thermoplastic elastomer composition adapted for adhering to a polar material, e.g. substrate, which exhibits a better combination of properties than obtained with the heretofore known comparable compositions.

A still further object of the present invention is an article comprised of a substrate having at least one adhered segment formed from the present composition, like an overmolded or co-extruded article.

These and other objects are achieved with the present invention in which a thermoplastic elastomer composition having improved surface adhesion properties also comprises the reaction product of a functionalized thermoplastic rubber, such as a maleic anhydride graft functionalized thermoplastic rubber, with at least one polyamide. The resultant product has improved adhesion to polar materials.

DETAILED DESCRIPTION OF THE INVENTION

A composition according to the present invention comprises a combination of a thermoplastic elastomer with the reaction product of a functionalized thermoplastic rubber segment, such as, for instance, a maleated thermoplastic rubber triblock or block copolymer (like styrene/ethylene-butylene/styrene blockcopolymer, (SEBS), with at least one polyamide (PA). The composition therefore comprises:

a) a thermoplastic elastomer which can be fully or partially cross-linked;

b) an adhesion promoter, which may, if desired, still be reactive, and contains at least a soft rubber segment and a polyamide segment, such as a grafted terpolymer obtained by reaction of a functionalized-SEBS with a polyamide; and, optionally, c) common additives.

A) Thermoplastic Elastomer

A thermoplastic elastomer is a product which combines the flexibility of a rubber with the strength and the processability of a thermoplast. The thermoplastic elastomer (TPE) according to the invention can be chosen from the group comprising the styrene-based TPEs (STPEs) and the rubber/thermoplast blends, which include the thermoplastic elastomeric polyolefins (TPOEBs) and the thermoplastic elastomeric vulcanizated (TPOEVs).

a) Styrene-Based TPEs

Styrene-based thermoplastic elastomers are polymers which consist of polymer chains with a polydiene central block and polystyrene terminal blocks (also called SBDS, styrene block copolymers). The diene block gives the polymer its elastomeric properties, while the polystyrene blocks constitute the thermoplastic phase. By preference, the polydiene block is composed of butadiene units, so that the resulting TPE is an SBS (styrene-butadiene-styrene polymer).

Since the main chain of an SBS contains unsaturations which are oxidation sensitive, the styrene-based TPE preferably is a hydrogenated polymer, i.e. a polymer in which at least part of the aliphatic unsaturation has been hydrogenated. Such products are also referred to as SEBS polymers (styrene-ethylene/butylene-styrene).

Where in the foregoing the presence of styrene and/or butadiene in the STPEs has been mentioned, this is to elucidate rather than to restrict the term 'STPE', considering that an analogous result is to be obtained with polymers comprising blocks of polyisoprene (SIS: styrene-isoprene-styrene) or based on substituted styrene (for example α-methylstyrene).

The STPE applicable according to the invention can also be a blend of a polyolefin, prefarably polypropylene homo- and copolymer, and an SBC.

b) Rubber-Thermoplast Blends

The rubber-thermoplast blends, and more specifically the TPOEs (thermoplastic polyolefin elastomers) can roughly be divided into three categories:

1) TPOEBs, which are blends of a thermoplastic polyolefin, and a hydrocarbon rubber;

2) TPOEVS, which are blends of a thermoplastic polyolefin, and at least partially vulcanized hydrocarbon rubber;

3) TPOERs, or reactor thermoplastic polyolefin elastomers, which are the product of a copolymerization of an elastomer segment on a thermoplastic polyolefin.

The difference between categories 1) and 2) on the one hand, and category 3) on the other therefore lies in the fact that the former categories comprise blends and the latter category comprises copolymers. In all cases the morphology is that of a polyolefin resin, as a continuous matrix in which the elastomer is distributed, whether or not partially crosslinked, as a dispersed phase. When a TPOER has been prepared the rubber component can also be at least partially vulcanized; since the rubber component is already anchored to the polyolefin resin, especially to the polyolefin component, this is not strictly necessary.

The thermoplastic polyolefinic component in the TPOE can include thermoplastic crystalline polyolefin homopolymers and copolymers. These polyolefins can be prepared from monoolefin monomers having from 2 to 7 or more carbon atoms. Suitable such monolefins include ethylene, propylene, 1-butene, isobutylene, 1-pentene, 1-hexene, I-octene, 3-methyl-1-pentene, 4-methyl-1-pentene, 5-methyl-1-hexene, a mixture of any thereof, and copolymers thereof with one or more functional unsaturated monomers, like (meth)acrylates and/or vinyl acetates. The monoolefins having from 3 to 6 carbon atoms may be preferred, and of these propylene is readily available.

The relative amount of polyolefin to rubber (matrix to dispersed phase) in the TPOE can generally be from about 8 to about 90 weight percent polyolefin. The amount of polyolefin can be varied, but is typically in the range of about 10 to about 60 percent by weight of the thermoplastic elastomer component.

In principle, the dispersed phase in a suitable thermoplastic olefinic elastomer can be any rubber known to those skilled in the art. For instance, the rubber can comprise at least one copolymer rubber (e.g., ethylene-propylene rubber, EPR), a terpolymer of ethylene, propylene and a non-conjugated diene (EPDM), and/or butyl rubber. As evident, in general, the rubbers can include butyl rubber (copolymer as well as terpolymers, and also in its halogenated form); ethylene/α-olefin copolymer rubber (EAM) as well as ethylene/α-olefin/diene terpolymer rubber (EADM); acrylonitrile/butadiene rubber (NBR); styrene/butadiene rubber (SBR); natural rubber (NR). Use can also be made of an SBC, as described before. In case of EAM or EADM rubber, the α-olefin in such a rubber is preferably propylene; in such a case the rubber is referred to as EP(D)M.

A thermoplastic olefinic elastomer is called a thermoplastic olefinic elastomer vulcanizate (TPOEV) herein when the rubber in the TPOE has a degree of vulcanization such that the amount of extractable rubber is less than 90%. The test to determine such an extractable amount is generally done with a solvent in which the polyolefin as well as the not-vulcanized rubber are soluble. A suitable solvent is boiling xylene. In principle, the rubber in the TPOEV is preferably vulcanized to the extent that the amount of extractable rubber is less than 15%, more preferred even less than 5%.

By vulcanizing the rubber in a TPOE, the physical properties of the resulting TPOEV, as well as the physical properties of e.g. a resulting overmolded polymeric article are improved.

The thermoplastic elastomer can be fully or partially vulcanized with various vulcanization systems. The rubber in a TPOE can be vulcanized with any vulcanization system that is known in the art. For instance, in the case of EA(D)M-rubber sulphur systems, peroxide systems and preferably vulcanization systems based on a phenolic resin are used. In general, suitable vulcanization agents and systems are described in Hoffman, "Vulcanization and Vulcanizing Agents", Palmerton Publ. Co, N.Y., 1967, and in U.S. Pat. No. 3,806,558 and U.S. Pat. No. 5,021,500, the complete disclosures of which are incorporated herein by reference.

The present thermoplastic elastomer composition which is capable of adhering to polar substrates contains an amount of at least one of said thermoplastic elastomer sufficient to impart rubber-like elasticity to the composition. Rubber-like means elastomeric properties, and greater softness than polypropylene or polyethylene.

B) Adhesion Promoter

The adhesion promoter comprises a reaction product of a functionalized thermoplastic rubber, such as one based on a functionalized SEBS or EPDM, with at least one polyamide. The adhesion promoter can be combined with the at least one thermoplastic elastomer in an amount sufficient to improve the adhesion of the resultant composition to a polar material, e.g. polar substrate.

The thermoplastic rubber segment in the adhesion promotor can be any rubber known in the art. Reference can be had to the rubbers, mentioned before as being suitable for use in a TPOE. The adhesion promoter can be an elastomeric block-copolymer, which can include a triblock copolymer, such as a copolymer having polystyrene end blocks, and poly (ethylene/butylene) midblocks, e.g. a styrene-α-olefin/other α-olefin-styrene block copolymer, as well as styrene-butadiene-styrene and styrene-isoprene-styrene copolymers. Generally such a block-copolymer may contain about 10 to about 75 weight % of the "elastomer" segment (non-aryl α-olefin) e.g., a "mid block". Another feasible option is that the thermoplastic rubber segment in the adhesion promoter is selected from EAM and EADM rubber, preferably EPM and EPDM.

Optionally the block-copolymer may further be compounded with a polyolefin or a common additive mixture thereof.

The thermoplastic rubber segment is functionalized with one or more functional groups such as carboxylic acids and derivatives thereof, including acid anhydrides, acid chlorides, isocyanates, oxazolines, amines, hydroxides and epoxides. The reactive functionalized soft segment can be prepared according to methods known to those skilled in the art. Various techniques for effecting such functionalization can be used, including those described in Xanthus (editor), Reactive Extrusion (Hanser 1992), the 20 complete disclosure of which is incorporated herein by reference. By present preference, the thermoplastic rubber segment is functionalized with at least one type of anhydride, and most preferably maleic anhydride. Suitable materials can be made or can be obtained commercially, such as Kraton FG 1901X and Kraton Rubber FG 1924X brand functionalized copolymers.

As used herein, the term SEBS-MAH refers to a maleated styrene-ethylene/butylene-styrene block copolymer, the term EPDM-MAH refers to a maleated EPDM-rubber.

The polyamides which can be effectively reacted with a functionalized thermoplastic rubber, such as SEBS-MAH or EPDM-MAH, are, in principle, not restricted. The polyamide can comprise one or more of the known polyamides. The polyamide is preferably at least one selected from among polymers formed from caprolactam, aminocaproic acid, enantholactam, 7-amino-heptanoic acid, 11-aminoundecanoic acid, or the like, or polymers obtained by polycondensation of suitable diamines (such as butanediamine, hexamethylenediamine, nonamethylenediamine, undecamethylenediamine, dodecamethylenediamine, m-xylenediamine, and the like) with suitable dicarboxylic acids (such as terephthalic acid, isophthalic acid, adipic acid, sebacic acid, dodecanedibasic acid, glutaric acid, etc.), copolymers thereof or blends thereof. Specific examples include aliphatic polyamid resins (such as polyamide 4.6, polyamide 6, polyamide 6.6, polyamide 6.10, polyamide 11, polyamide 12, and polyamide 6.12) and aromatic polyamide resins (such as poly(hexamethylenediamine terephthalamide), poly(hexamethylene isophthalamide), xylene group-containing polyamides and amorphous polyamide). Polyamide 6, polyamide 6.6, and polyamide 12 are preferable, and of these the polyamides known as Nylon 6 and Nylon 6.6 are presently preferred.

In general, polyamides are described in Ullmann's Encyclopedia of Industrial Chemistry, volume A21, pages 179–205 (VCH Pub. 1992), Encyclopedia of Polymer Science and Technology, volume 10, pages 483–597 (John Wiley 1969), Encyclopedia of Polymer Science and Technology, volume 19, pages 454–518 (4th Ed., John Wiley 1996), and Encyclopedia of Polymer Science and Engineering, volume 11, pages 315–381 (John Wiley 1988), the complete disclosures of which are incorporated herein by reference.

The molecular weight of the polyamide is, in principle, not restricted. For instance, the polyamide can have a relatively low number average molecular weight in the range of about 10,000 to about 40,000. Good results have been obtained with polyamides having molecular weights in the range of 15,000 to about 35,000.

In a presently preferred embodiment, the adhesion promotor can be prepared by a condensation reaction of the at least one functionalized thermoplastic rubber with at least one polyamide. By preference, the functionalized thermoplastic rubber is a functionalized SBS or SEBS, such as SBS-MAH (like Ricon 184/MA from Ricon Resins; a butadiene-styrene copolymer grafted with 6 wt % of maleic anhydride) or SEBS-MAH. The amount of functionalization, e.g., amount of introduced functionality (groups), is preferably between 0.2 to 12 wt %, more preferably between 2 wt % to 5 wt. %. The actual amount can be varied, such as to match the relative functionality of the polyamide.

The adhesion promoter from the at least one functionalized thermoplastic rubber segment and the at least one polyamide can first be prepared. For instance, at least one polyamide and at least one functionalized SEBS can be reacted in the melt in a extruder at a temperature above the melting point of the polyamide. The extruder can be a single or double screw type extruder The thus prepared adhesion promoter can then be melt-mixed or dry-blended with the thermoplastic elastomer. An effective amount of the adhesion promoter can therefore be melt-mixed or dry blended with the selected thermoplastic elastomer(s) which can be of the desired hardness. This melt-mixing can be made either on down-stream during manufacturing of the thermoplastic elastomer or in a second pass in a Banbury, single or double screw type extruder. Alternatively the functionalized thermoplastic rubber segment and the polyamide can be melt mixed with the thermoplastic elastomer in one step.

In the adhesion promoter, the amount of the functionalized thermoplastic rubber is preferably between 10 and 90 weight % and the amount of the polyamide is between 90 and 10 weight %. Preferably, the amount of the functionalized segment is between 30 and 60 weight %. All amounts based on the total weight of the adhesion promotor. In general, by incorporating an adhesion promoter, like grafted SEBS-MAH-PA, at a level of between 2 and 60 wt %, relative to the TPE, into the TPE, and more particularly between 10 and 30 wt %, adhesion improvements with the substrate material are obtainable.

In principle, the adhesion promoter can be combined with a SMA-type polymer in the formulation of the "adhesively modified" TPE, or can be added during the preparation of the adhesion promoter. SMA-type copolymers are polymers based on one or more vinylaromatic monomers, and anhydrides or imides of an α-β-unsaturated dicarboxylic acid; they are described in the Encyclopedia of Polymer Science and Engineering, volume 16, pages 77–78(including citations) (1989) and maleic polymers, including SMA-types, are described in Encyclopedia of Polymer Science and Engineering, volume 12, pages 225–294 (1989), the complete disclosures of which are incorporated herein by reference. The amount of SMA-type polymer added can be varied, but is preferably in a small amount relative to the formulated composition. In general it will be also be low relative to the amount of the adhesion promoter described elsewhere herein.

C) Additives

The present thermoplastic elastomer composition can include, if desired, one or more additives. The particular additive or additive package (a combination of additives) selected will depend on the final end-use of the present composition. Suitable additives include, among others, reinforcing and non-reinforcing fillers, fibers (like glass, carbon fibers or carbon fibrils), processing oils, extender oils, plasticizers, waxes, stabilizers, antioxidants, cross-linking agents, processing aids, lubricants, foaming agents, flame retardant packages, pigments and other coloring agents. Fillers and extenders which can be utilized include conventional inorganic substances, such as calcium carbonate, clays, silica, talc, titanium dioxide, carbon black and the like. Some materials, such as some fillers, can serve a plurality of functions. For instance, antimony trioxide can function as a filler and also provide, preferably in combination with other materials, some flame retardancy to the present thermoplastic elastomer composition. In general, suitable rubber processing oils are paraffinic, naphthenic or aromatic oils derived from petroleum fractions. The type of the oil selected can be one that ordinarily is used in combination with the specific rubber or rubbers in the present composition. These additives can comprise a significant amount of the total formulated composition. More particularly, when present, one or more additives can be present in amounts greater than 0 wt. % up to approximately 70 wt. %, and more generally up to about 50 wt. %, relative to the complete formulated composition. For instance, some formulations can include processing oils, flame retardants, and other additives, which in the aggregate are present in an amount on the order of approximately 70 wt. %.

Additives, including fillers and the like, are further described in the Rubber World Magazine Blue Book, as well as in Gaehter et al., Plastics Additives Handbook, (Hanser 1990), the complete disclosures of which are incorporated herein by reference.

D) Polar Materials—Substrates:

The thermoplastic elastomer composition of the present invention can be applied to a diverse range of substrates. The substrates can include, for instance, polar substrates such as those based on polar polymers, such as engineering resins, and inorganic materials, such as glass or metal. Suitable engineering resins include various polyamides of which Nylon 6 and Nylon 66 are exemplary. It is not necessary for the polar substrate to be chemically reacted with the applied composition. Suitable substrates also include blends of engineering resins with polyamides (like polypropylene/polyamide/alloys or an ABS/polyamide alloy (ABS being an acrylonitril/butadiene/styrene copolymer)).

Polymeric substrates, e.g. a polar material, can include automotive parts, such as body panels comprised of polymeric compositions, such as blends, semi-interpenetrating polymer networks, or full interpenetrating polymer networks, which can contain, for instance, polar polymers (polyamides etc.) alone or in combination with additional polymers such as polyureas or polyurethanes. A sufficiently polar polymeric substrate is adherent to a composition according to the present invention.

The thermoplastic elastomer composition of the present invention can also be connected to a substrate in a sequential form: a block of substrate connected to a block of the thermoplastic elastomer composition.

Certain support members, such as tubular or even solid form, which are susceptible to corrosion can be suitably coated with an adherent layer(s) formed from the present composition. Illustrative such support members include steel tubes. The present composition can be extruded over such a substrate, or applied to the substrate in a fluidized bed process.

Other useful products include those having engineering substrates but which require a softer hand feel, such as knife handles, power and hand tool covers and handles and the like. For instance, the present compositions are readily formulated for overmolding at least a portion of drill handle casings of nylons or other engineering substrates. The drill handles can be for smaller hand drills, larger industrial fastener tools, or other power tools. overmolding can be accomplished in different manners including co-extrusion overmolding.

The present invention therefore further includes articles comprising a substrate in combination with one or more layers or connections which are formed, in whole or in part, from the present composition. The substrate can be covered in whole or in part with one or more layers. Such articles include drill handles, automobile parts (metal or polymeric substrates), and the like. Those articles can be made by different plastic processing techniques, like injection overmolding, 2-shot injection molding, co-extrusion (like co-extrusion with nylon(-blends), blowmolding (like multi-layer blow molding with nylon) and the like. The thermoplastic elastomer composition can preferably be used as the base material for a glass run channel; a polyamide co-extruded therewith can provide low friction). Common internal thermoplastic lubricants can be used to further improve the abrasion resistance and reduce the coefficient of friction of the polyamide. These include: poly (tetrafluoroethylene), poly. (methylsiloxane), molybdenum disulfide, graphite powder and different multiple lubricant systems (e.g. a combination of polytetrafluoroethylene and an other solid polymer lubricant).

In all those cases, the thermoplastic elastomeric composition is processed above its melting point. It has been found to be advantageous that the melt temperature of the composition is at least 250° C. Also the temperature of the substrate during the preparation of the article is of importance. It has been found advantageous to preheat the substrate, preferably to a temperature above 125° C. Care should of course be taken that the processing conditions are such as to avoid deterioration of the thermoplastic elastomer composition and/or the substrate by e.g. thermal or oxidative degradation.

All patents, publications and other literature cited herein are each completely incorporated herein by reference.

The following non-limiting Examples further describe the present invention.

EXAMPLES

The term SEBS-MAH means a maleated styrene-ethylene/butylene-styrene block copolymer. The SEBS-MAH used in the Examples contained about 1–2% maleic acid anhydride. Maleated copolymers, such as the Kraton® brand copolymers (Shell Chemical) FG-1901X (2% maleic anhydride) and FG-1924X, are suitable.

The term EPDM-MAH means a maleated ethylene propylene diene polymer and in the Examples a MAH-EPDM which contained about 2% maleic anhydride was used. This product is commercially available from Uniroyal as "Royaltuf 485."

The term PA means polyamide. The term PA6 means a Nylon 6. Suitable Nylon 6 polyamides include hose sold under the trade designation Ultramide® B3, B35, B4 and these are available from BASF.

Glass reinforced polyamides are suitable for use in the present invention as substrates. Different grades of glass reinforced toughened nylons are available from DSM including Akulon J-7/33 brand Nylon 6 and Aukulon J-70/30 brand Nylon 66.

The term EPDM-MAH-PA designates the reaction product of EPDM-MAH with a polyamide.

The term SEBS-MAH-PA means the reaction product of MAH-SEBS with a polyamide.

The term TPE means a thermoplastic elastomer product, such as Sarlink® 3160B brand TPE from DSM Thermoplastic Elastomers. The latter exemplary TPE has a Shore A durometer hardness of 60.

The adhesion between a thermoplastic elastomer composition according to the present invention and various substrates, such as a toughened nylon-based material, were evaluated. In general, the present compositions can be insert injection molded over the substrates at suitable process conditions.

The sample preparation and the test methodology for determining peel strength adhesion performance are as follows:

Peel Test Methodology

This test determines the amount of force in Newtons required to peel an overmolded sample formed from the test composition from a selected substrate. The substrate is prepared by molding 4"*4"*⅛" (10.2 cm*10.2 cm*3.2 mm) plaques under conditions appropriate for the selected substrate material. The molded plaque is cut diagonally to form two equally sized triangular samples.

A triangular metal insert having the dimensions corresponding to the triangular substrate sample fills the mold space adjacent to the substrate sample in a four inch by four inch (10.2*10.2 cm) plaque mold (depth 0.25 inch; 6.4 mm). The selected base composition ("adhesively modified TPE") including the adhesion promoter is molded over both the substrate sample and metal insert. The melt temperature and mold temperature are selected to be appropriate for the base composition. The metal insert is then removed from the sample. The sample is then allowed to set for about 24 hours. A tensile bar, 1.0 inch (2.5 cm) in width is cut completely through the overmolded composition, but not through the substrate as shown in FIG. 2.

The peel test commences by starting to peel by hand the overmolded composition from the substrate. An Instron Tensile Tester (Model 1130) equipped with a sliding grip (peel mode) is set to Peel/Tear Standard program, and the samples are evaluated with such device. Actual values (values in Newton ("N")) are determinable, for instance, by using an average line through the curve plotted from the data points (ignoring false peaks). The value is divided by the linear length to obtain a N/cm peel force reading. The results can be reported together with the melt temperature of the present composition and the mold temperature.

The adhesion between the adhesively modified thermoplastic elastomer composition of the present invention and various substrates, such as an engineering resin substrates (e.g. a nylon 6 or a toughened glass reinforced nylon 6) was evaluated. The TPE containing the adhesion promoter was insert injection molded on each of the substrates. Nylon-type substrates were used, and these were pre-heated in an oven to a selected temperature and were placed into the plaque mold cavity. The adhesively modified TPE (e.g. TPE containing the adhesion promoter) was then injection over molded on the substrate at a seleted melt temperature. The injection overmolding was conducted using an Engel 40 Ton apparatus.

In the Examples hereinbelow various overmolded products are reported. Unless stated otherwise, these products were prepared as described in the precedent paragraph(s).

Example I

The composition of various adhesion promoters made on a twin screw extruder is reported in Table 1. These compositions were based on 50 wt %/5 wt % of the SEBS-MAR and PA in the adhesion promoter.

However, the relative amounts can be varied and still fall within the scope of the present invention.

The twin screw extruder was a 34 mm co-rotating extruder (Leistritz Mfg.). The melt temperature during extrusion was about 25° C. above the melting point of the polyamide. During the grafting operation, the extruder operated at about 250 to 300 rpm, althought the rpm values can be readily varied as appropriate. The first adhesion promoter, SEBS-MAH1-PA6, was based on Kraton FG 1924X brand thermoplastic rubber (Shell Chemical), which has a lower relative viscosity and contains about 1 wt. % bound maleic anhydride. The second adhesion promoter, SEBS-MAH2-PA6, is based on Kraton FG1901X, which has a higher viscosity and contains approximately 2 wt. % bound maleic anhydride. The third adhesion promoter, EPDM-MAH2-PA6, is based on maleated EPDM and contains about 2 wt. % maleic anhydride (Royaltuf 485 brand maleated EPDM from Uniroyal).

TABLE 1

| Adhesion Promoter | Types of functionalized rubber and amount utilized | Type of PA6 and amount used |
|---|---|---|
| SEBS-MAH1-PA6 | SEBS-MAH1 (1% MAH), 50% | Ultramid B3, 50% |
| SEBS-MAH2-PA6 | SEBS-MAH2 (2% MAH), 50% | Ultramid B3, 50% |
| EPDM-MAH2-PA6 | EPDM-MAH2 (2% MAH), 50% | Ultramid B3, 50% |

Example II

Table 2 shows peel strength of two formulations containing two types of adhesion promoters melt blended in a Sarlink® 3160B brand TPE from DSM, having an injection molded hardness of 62 Shore A. These materials were insert injection molded over Akulon J-7/33 brand toughened nylon 6 from DSM. The melt temperature was about 293° C. and the mold temperature was about 88° C. The pre-heat temperature of the nylon was about 149° C. A higher peel strength value for the adhesion promoter containing about 2% bound maleic anhydride was observed. The standard product (no adhesion promoter included) had only adhesive failure ("None" in Table 2), whereas the test samples showed cohesive failure, non-interfacial failure.

TABLE 2

|  | Standard | Formulation #1 | Formulation #2 |
|---|---|---|---|
| Sarlink ® 3160B | 100% | 85% | 85% |
| SEBS-MAH1-PA6 | — | 15% | — |
| SEBS-MAH2-PA6 | — | — | 15% |
| Peel Strength, N/cm | None | 34.6 | 41.4 |
| Failure mode | Peels off | Cohesive | Cohesive |

Example III

Table 3 shows the peel strength of the formulations given in Example II as a function of injection overmolding conditions. The peel strength appeared to decrease when a lowered pre-heat temperature of the nylon or a lowered melt temperature of the adhesion promoter was used.

TABLE 3

|  | Peel Strength, N/cm Condition O | Peel Strength, N/cm Condition A | Peel Strength N/cm Condition B |
|---|---|---|---|
| Formulation #1 | 34.6 | 25.8 | 5 |
| Formulation #2 | 41.4 | 26 | 8 |
| Failure Mode | Cohesive/Adhesive | Cohesive/Adhesive | Adhesive |
| Substrate | Akulon J-7/33 | Akulon J-7/33 | Akulon J-7/33 |

1) Overmolding Condition O: Melt Temp=293° C. & Preheat Temp=149° C.
2) Overmolding Condition A: Melt Temp=277° C. & Preheat Temp=149° C.
3) Overmolding Condition B: Melt Temp=277° C. & Preheat Temp=107° C.

Example IV

Table 4 shows the peel strength of formulations containing varying levels of SEBS-MAH2-PA6 melted blended in Sarlink® 3160B. These formulations were evaluated for peel strength according to the test methodology described above. In the sample preparation, the overmolding was carried out at a melt temperature of the adhesion promoter of 293° C. The preheat temperature of the polyamide was 149° C. The peel strength increased with increased amount of adhesion promotor.

TABLE 4

|  | Formulation #3 | Formulation #4 | Formulation #5 |
|---|---|---|---|
| Sarlink ® 3160B | 85% | 80% | 75% |
| SEBS-MAH2-PA6 | 15% | 20% | 25% |
| Peel Strength, N/cm | 39.4 | 43 | 56.6 |
| Failure Mode | Cohesive/Adhesive | Cohesive/Adhesive | Cohesive/Adhesive |
| Shore A Hardness | 66 | 69 | 71 |

Example V

Table 5 shows peel strength of formulations containing the same level of SEBS-MAR2-PA6 melt blended into various thermoplastic elastomer grades (different grades of Sarlink® brand thermoplastic elastomers from DSM). The test samples were prepared using the described overmolding procedure at a melt temperature of 293° C. and at a pre-heat temperature of 149° C.

TABLE 5

|  | Formulation #3 | Formulation #6 | Formulation #7 | Formulation #8 |
|---|---|---|---|---|
| SEBS-MAH2-PA6 | 15% | 15% | 15% | 15% |
| Sarlink ® 3160B | 85% | — | — | — |
| Sarlink ® 3150B | — | 85% | — | — |
| Sarlink ® 4165B | — | — | 85% | — |
| Sarlink ® 4155B | — | — | — | 85% |
| Peel Strength, N/cm | 39.4 | 34.6 | 33 | 30.3 |
| Shore A Hardness | 66 | 59 | 70 | 65 |
| Substrate | Akulon J7/33 | Akulon J7/33 | Akulon J7/33 | Akulon J7/33 |

Example VI

Table 6 shows the peel strength of melt-blended formulation Number 3, containing the same level of SEBS-MAH2-PA6, insert injection overmolded on various substrates at the same condition. This "Condition O" refers to the same overmolding processing conditions reported in Example V. Similar peel strength levels were observed; the sample having the Akulon J 70/30 brand nylon 66 substrate (DSM) showed a peel strength of 68 N/cm.

TABLE 6

|  | Formulation #3 | Formulation #3 | Formulation #3 | Formulation #3 |
|---|---|---|---|---|
| SEBS-MAH2-PA6 | 15% | 15% | 15% | 15% |
| Sarlink ® 3160B | 85% | 85% | 85% | 85% |
| Substrate | Akulon J-7/33 (PA6) | Ultramide B35 (PA6) | Capron 8233 (PA6) | Akulon J70/33 (PA66) |
| Peel Strength, N/cm @ Condition O | 39.4 | 39.7 | 37.9 | 68 |

Example VII

Table 7 shows the peel strength of two formulations containing another type of adhesion promoter (EPDM- MAH2-PA6) melt blended in Sarlink® 3160B brand TPE from DSM. These materials were insert injection molded over an Akulon J-7/33 based glass reinforced nylon 6 (DSM). The overmolding "Condition O" of Example III was applied in the sample preparation.

TABLE 7

|  | Formulation #9 | Formulation #10 |
|---|---|---|
| Sarlink ® 3160B | 85% | 75% |
| EPDM-MAH2-PA6 | 15% | 25% |
| Peel Strength, N/cm | 19.7 | 25.6 |
| Failure Mode | Adhesive | Adhesive |

Example VIII and Comparative Experiment A

Table 8 shows physical properties of various formulations of the invention compared to a an adhesive Santoprene® 191-70PA grade product (AES). By comparing a similar hardness material, such as formulation number 3 to the Santoprene 191A-70PA grade product, the composition according to the present invention exhibites an unexpectedly higher tensile strength, elongation at break, and tear force.

TABLE 8

|  | Formulation #3 | Formulation #7 | Formulation #8 | Santoprene 191-70PA |
|---|---|---|---|---|
| SEBS-MAH2-PA6 | 15% | 15% | 15% | — |
| Sarlink ® 3160B | 85% | — | — | — |
| Sarlink ® 4165B | — | 85% | — | — |
| Sarlink ® 4155B | — | — | 85% | — |
| Tensile Strength, Mpa (Strong Dir.) | 4.2 | 5.1 | 4.8 | 3.4 |
| Elongation (%) | 395 | 519 | 528 | 193 |
| Shore A Hardness | 66 | 70 | 65 | 66 |
| Tear Force, N | 89 | 98.7 | 89 | 47.7 |

Example IX

Table 9 compares dry blending of an adhesion promoter into a Sarlink® 3160B brand thermoplastic elastomer (DSM) at two different levels versus an adhesion promoter obtained using melt blending. The "Condition O" refers to the overmolding "Condition 0" as reported herein above in the Examples.

TABLE 9

|  | Formulation #3 Melt Blend | Formulation #10 Melt Blend | Formulation #11 Dry Blend | Formulation #12 Dry Blend |
|---|---|---|---|---|
| SEBS-MAH2-PA6 | 15% | 25% | 15% | 25% |
| Sarlink ® 3160B | 85% | 75% | 85% | 75% |
| Substrate | Akulon J-7/33 | Akulon J-7/33 | Akulon J-7/33 | Akulon J-7/33 |
| Peel Strength, N/cm @ Condition O | 39.4 | 56.6 | 29.5 | 51.2 |

Example

Table 10 shows the peel strength of formulations containing SEBS-MAH2-PA6 adhesion promoter; the components of the adhesion promoters are melt blended in a Sarlink® grade brand thermoplastic elastomer; and thereafter molded on Akulon J-7/33 brand glass reinforced nylon 6 (DSM) under overmolding Condition O. Formulation number 13 adhesion promoter was prepared in situ during melt blending with the TPE. The hardness tended to increase without a demonstrated advantage in peel strength.

TABLE 10

|  | Formulation #3 | Formulation #13 |
|---|---|---|
| Sarlink ® 3160B | 85% | 85% |
| SEBS-MAH2-PA6 | 15% | *** |
| PA6 | — | 7.5% |
| SEBS-MAH2 | — | 7.5% |
| Peel Strength, N/cm | 39.4 | 25.2 |
| Shore A Hardness | 66.1 | 72 |

Example XI and Comparative Experiments B and C

Table 11 shows peel strength comparisons of blending SEBS-MAlH (2 wt % MAR), PP-MAH (ca. 2 wt % MAH; Polybond 3150 brand maleated polypropylene from Uniroyal Chemical) and SEBS-MAH2-PA6 into Sarlink® 3160 at the same level. The Condition O is as earlier reported.

TABLE 11

|  | Formulation #3 Melt Blend | Formulation #14 Melt Blend | Formulation #15 Melt Blend |
|---|---|---|---|
| Sarlink ® 3160B | 85% | 85% | 85% |
| SEBS-MAH2-PA6 | 15% | — | — |
| SEBS-MAH2 | — | 15% | — |
| Polybond 3150 | — | — | 15% |
| Substrate | Akulon J-7/33 | Akulon J 7/33 | Akulon J 7/33 |
| Peel Strength, N/cm @ Condition O | 39.1 | 6 | 19.7 |
| Shore A hardness | 66 | 64 | 80 |

What is claimed is:

1. Adhesive thermoplastic elastomer composition comprising either a blend of a thermoplastic polyolefin resin and a rubber (TPOE) or a thermoplastic elastomeric styrene based blockcopolymer (STPE), wherein the composition also comprises 2–60 wt %. of an adhesion promoter in the form of a reaction product of a functionalized rubber and a polyamide.

2. Composition according to claim 1, wherein the rubber in the functionalized rubber is selected from the group consisting from styrene based blockcopolymers, EAM and EADM rubber.

3. Composition according to anyone of claims 1–2, wherein the styrene based blockcopolymer is a styrene-butadiene-styrene block copolymer, or a styrene-ethylene-butylene-styrene block copolymer.

4. Composition according to claim 1, wherein the functional group in the functionalized rubber is an anhydride.

5. Composition according to claim 1, wherein the amount of functionalized groups in the functionalized rubber is in the range between 0.2 and 12 wt %.

6. Composition according to claim 1, wherein the amount of polyamide in the adhesion promoter is in the range of between 10–90 wt %.

7. Composition according to claim 1, wherein the rubber in TPOE is selected from the group consisting from EPR, EPDM, NBR, SBR and butyl rubber.

8. Composition according to claim 1, wherein the rubber in TPOE is vulcanized to the extend that the amount of extractable rubber is at most 15%.

9. Composition according to claim 8, wherein the rubber in TPOE is vulcanized to the extend that the amount of extractable rubber is at most 5%.

10. Composition according to claim 1, wherein the thermoplastic resin in TPOE is a propylene homo- or copolymer.

11. Composition according to claim 1, wherein the polyamide in the adhesion promoter is selected from the group consisting from Nylon 4.6, Nylon 6, Nylon 6.6, and Nylon 12.

12. Composition according to claim 1, wherein the polyamide in the adhesion promoter has a number average molecular weight in the range of between 15,000 and 40,000.

13. Composition according to claim 1, wherein the amount of the adhesion promoter is in the range of between 10 to 30 wt. %.

14. Process for preparation of a composition according to claim 1, comprising reacting a functionalized rubber with a polyamide at a temperature above the melting point of the polyamide, melt-mixing or dry-blending resulting product with a thermoplastic elastomer selected from the group consisting from a TPOE and a STPE.

15. Process for the preparation of an article comprising a substrate in combination with an adhesive composition, comprising:

heating a composition according to claim 1 to a temperature above the melting point followed by combining said heated composition with said substrate.

16. Process according to claim 15, wherein the composition is heated to a temperature of at least 250° C.

17. Article comprising a substrate, in combination with a composition according to claim 1.

18. Article according to claim 17, wherein the substrate is nylon.

19. Article according to claim 17, wherein the article is in the form of a glass run channel.

20. Article according to claim 18, wherein the article is in the form of a glass run channel.

21. Article comprising a substrate, in combination with an adhesive thermoplastic elastomer composition, wherein said composition is obtained according to claim 15.

22. Article comprising a substrate, in combination with an adhesive thermoplastic elastomer composition, wherein said composition is obtained according to claim 16.

* * * * *

UNITED STATES PATENT AND TRADEMARK OFFICE
CERTIFICATE OF CORRECTION

PATENT NO. : 6,300,183 B1
DATED : October 9, 2001
INVENTOR(S) : Gerber et al.

Figure 4:
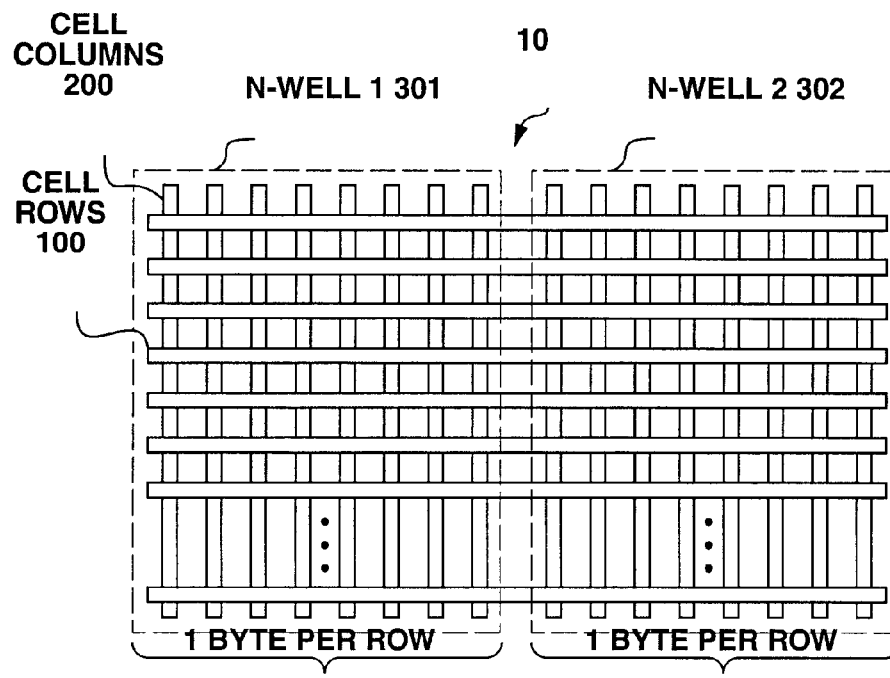

It is certified that error appears in the above-identified patent and that said Letters Patent is hereby corrected as shown below:

Drawings,
On Sheet 2 of 6, Figure 4, Figure 4 is not prior art, therefore, the legend
" (PRIOR ART) " should not appear in association with this drawing Figure 4.
Attached is a corrected drawing Figure 4, without the incorrect " (PRIOR ART) "
legend.

Signed and Sealed this

Twenty-third Day of July, 2002

*Attest:*

JAMES E. ROGAN
*Attesting Officer*     *Director of the United States Patent and Trademark Office*